(12) United States Patent
Hodgson et al.

(10) Patent No.: US 9,032,712 B2
(45) Date of Patent: May 19, 2015

(54) METHOD FOR HEATING A DELIVERY SYSTEM AND MOTOR VEHICLE HAVING A DELIVERY SYSTEM

(71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 13/975,768

(22) Filed: Aug. 26, 2013

(65) Prior Publication Data

US 2013/0340409 A1    Dec. 26, 2013

Related U.S. Application Data

(63) Continuation of application No. PCT/EP2012/052435, filed on Feb. 13, 2012.

(30) Foreign Application Priority Data

Feb. 25, 2011    (DE) .......................... 10 2011 012 441

(51) Int. Cl.
  *F01N 3/00*    (2006.01)
  *F01N 3/08*    (2006.01)
  *F01N 3/20*    (2006.01)

(52) U.S. Cl.
  CPC .............. *F01N 3/08* (2013.01); *F01N 2610/02* (2013.01); *F01N 2900/1811* (2013.01); *Y02T 10/24* (2013.01); *F01N 3/208* (2013.01); *F01N 2610/105* (2013.01); *F01N 2610/144* (2013.01)

(58) Field of Classification Search
  CPC ....... F01N 3/206; F01N 3/208; F01N 3/2066; F01N 2550/22; F01N 2610/02; F01N 2610/10; F01N 2900/1631; F01N 2900/1806; F01N 2900/1811; F01N 2900/1812; F01N 2900/1821; F01N 2900/1822; Y02T 10/24

USPC .......... 60/272, 273, 282, 284, 286, 295, 301, 60/303

See application file for complete search history.

(56) References Cited

U.S. PATENT DOCUMENTS 7,849,674 B2    12/2010  Masuda et al.
2009/0025373 A1  1/2009  Buerglin et al.
(Continued)

FOREIGN PATENT DOCUMENTS

DE    102004061259 A1    7/2006
DE    102005036430 A1    2/2007
(Continued)

OTHER PUBLICATIONS

International Search Report of PCT/EP2012/052435, Dated May 22, 2012.

*Primary Examiner* — Thomas Denion
*Assistant Examiner* — Mickey France
(74) *Attorney, Agent, or Firm* — Laurence A. Greenberg; Werner H. Stemer; Ralph E. Locher

(57) ABSTRACT

A method for heating a delivery system providing reducing agent to an exhaust gas treatment device of an internal combustion engine having electrical components, includes determining a temperature in the delivery system, determining thermal energy required for error-free operation of the delivery system in a time interval, and introducing the required thermal energy into the delivery system by operating the electrical components within the time interval. The electrical components are activated at a time offset of at least 30 seconds. The required energy is determined so that the quantity of reducing agent to be delivered hourly is provided in liquid form at least four times after the time interval. The method prevents overloading of an electrical system of a motor vehicle when heating the delivery system and prevents ice cavity formation in a reducing agent in a tank. A motor vehicle having a delivery system is also provided.

17 Claims, 3 Drawing Sheets

(56) References Cited

U.S. PATENT DOCUMENTS

| | | | |
|---|---|---|---|
| 2009/0084095 A1* | 4/2009 | Dalton | 60/301 |
| 2010/0043409 A1* | 2/2010 | Naydenov et al. | 60/287 |
| 2010/0050606 A1* | 3/2010 | Fulks et al. | 60/286 |
| 2010/0095653 A1 | 4/2010 | Thiagarajan et al. | |
| 2010/0107615 A1* | 5/2010 | Chmielewski et al. | 60/303 |
| 2010/0186374 A1* | 7/2010 | Peucat et al. | 60/274 |

FOREIGN PATENT DOCUMENTS

| | | |
|---|---|---|
| DE | 102006012855 A1 | 9/2007 |
| EP | 1669567 A1 | 6/2006 |
| FR | 2929327 A3 | 10/2009 |

* cited by examiner

METHOD FOR HEATING A DELIVERY SYSTEM AND MOTOR VEHICLE HAVING A DELIVERY SYSTEM

CROSS-REFERENCE TO RELATED APPLICATION

This is a continuation application, under 35 U.S.C. §120, of copending International Application No. PCT/EP2012/052435, filed Feb. 13, 2012, which designated the United States; this application also claims the priority, under 35 U.S.C. §119, of German Patent Application DE 10 2011 012 441.1, filed Feb. 25, 2011; the prior applications are herewith incorporated by reference in their entirety.

BACKGROUND OF THE INVENTION

Field of the Invention

The present invention relates to a method for heating a delivery system for supplying reducing agent to an exhaust gas treatment device of an internal combustion engine having a multiplicity of electrically operated components. The method of selective catalytic reduction (SCR) can be carried out by using the reducing agent which is added. The invention also relates to a motor vehicle having a delivery system.

In selective catalytic reduction, nitrogen compounds in the exhaust gas are converted by the reducing agent into harmless substances, such as carbon dioxide, water and nitrogen. Ammonia is often used as a reducing agent. As a rule, ammonia is not stored as such in motor vehicles but instead is stored in the form of a reducing agent precursor, which is then converted to the actual reducing agent in the exhaust system and/or in an interposed evaporator unit and/or hydrolysis unit. One reducing agent precursor which is used particularly often is an aqueous urea solution. A 32.5% aqueous urea solution provided for that purpose is obtainable under the trademark AdBlue®, for example. In the text which follows, the terms "reducing agent" and "reducing agent precursor" are used synonymously. In particular, reducing agent precursor is referred to as reducing agent.

As a rule, a delivery system is provided in the vehicle to supply the reducing agent. Such delivery systems include a tank for storing the reducing agent, lines for connecting the tank fluidically to the exhaust gas treatment device, a pump for delivering the reducing agent, filters for cleaning the reducing agent and sensors for monitoring the operation of the delivery system and/or the properties of the reducing agent. At temperatures below −11° C., the reducing agent solidifies and is therefore impossible to deliver. In order to ensure that the delivery system nevertheless operates without problems, even at such low temperatures, and in particular to thaw the reducing agent after the vehicle has been stationary for a prolonged period, there is a known practice of providing heating elements which melt or heat the frozen and solidified reducing agent. One known practice carried out for that purpose, in particular, is to employ heating elements and to use the heat of electrically operated components of the delivery system to thaw the reducing agent. PTC heating elements (PTC: Positive Temperature Coefficient), in particular, have become established as heating elements. In those heating elements, the electric resistance is proportional to the temperature of the heating element. As a rule, the temperature dependence of the resistance is nonlinear, and therefore such heating elements can be used in a self-regulating manner for predetermined temperature ranges.

If the reducing agent is thawed and the thawed reducing agent is removed immediately, an ice cavity can form in the reducing agent, preventing effective heat conduction from the heater to the frozen reducing agent.

In that context, there is a desire that delivery systems for reducing agents should be operational 20 minutes after starting at an outside temperature above −20° C. For lower temperatures, the time after which the delivery system should be operational is longer. Thus, the delivery system should be operational after 30 minutes at an outside temperature of between −20° C. and −30° C., for example. There is therefore a known practice of switching on all of the heating components of a delivery system in order to achieve as rapid as possible thawing of the reducing agent. However, when the motor vehicle is started, other electric loads are also switched on, and therefore the onboard electrical network can easily be overloaded.

BRIEF SUMMARY OF THE INVENTION

It is accordingly an object of the invention to provide a method for heating a delivery system and a motor vehicle having a delivery system, which overcome the hereinafore-mentioned disadvantages and at least partially solve the highlighted technical problems of the heretofore-known methods and vehicles of this general type. In particular, the intention is to indicate a method which prevents overloading of an onboard electrical network and nevertheless allows operation of the delivery system as intended.

With the foregoing and other objects in view there is provided, in accordance with the invention, a method for heating or thawing a delivery system for supplying reducing agent to an exhaust gas treatment device of an internal combustion engine having a multiplicity of electrically operated components. The method comprises at least the following steps:
a) determining at least one temperature in the delivery system,
b) determining a thermal energy required for (trouble-free) operation of the delivery system in a time interval,
c) feeding the required thermal energy into the delivery system by operating the electrically operated components within the time interval, and activating the electrically operated components with a time offset in each case.

As a rule, the delivery system includes a tank for storing the reducing agent and a metering module for delivering the reducing agent to an injector. The reducing agent is introduced into the exhaust gas treatment device through the use of the injector. The metering module is preferably disposed in the base or a sump region of the tank and includes a housing, in which a distributor block is disposed. The further components of the metering module, in particular, are assigned to the distributor block, and therefore the distributor block preferably forms a foundation or holder for all of the other components and/or the housing. In particular, a line, a filter element disposed in the line and having a filter heater, a pump and a return line with a solenoid valve for selective return of the reducing agent to the tank, are integrated into the distributor block and/or assigned to the latter. Moreover, the metering module includes at least one sensor for detecting at least one state variable of the delivery system and/or of the reducing agent. Thus, for example, a temperature sensor for detecting the temperature in the metering module and/or at least one pressure sensor for detecting the pressure in the line can be provided. An ultrasonic sensor for detecting the filling level of the tank can also be provided in the metering module. The delivery system furthermore preferably includes at least one electric heater which, if appropriate, is connected in a heat-conducting manner to other component parts of the delivery system by heat-conducting elements.

In method step a), a temperature of a component of the delivery system and/or of the reducing agent is determined at least at one point in the delivery system. Preferably, both the temperature of the reducing agent and the temperature of a large-volume component of the delivery system are determined. Temperature information from other points in the motor vehicle can furthermore be used by the method according to the invention, by accessing remote temperature sensors in the vehicle through a bus system (CAN) and processing the measurement results thereof, for example. After the delivery system has been idle for a long time, the temperature should be almost equal at all points in the delivery system and in the reducing agent. The state of aggregation of the reducing agent can be determined from the determined temperature and/or from an average of the ascertained temperatures. Moreover, the ascertained temperature is characteristic of the thermal energy stored in the delivery system.

The thermal energy (currently) stored in the delivery system is derived (that is to say, for example, estimated and/or calculated) from the known heat capacity of the delivery system combined with the (current) temperature of the delivery system and from the last known quantity of reducing agent and the specific heat capacity thereof. Moreover, it is possible to take into account the thermal energy introduced in a preceding operating cycle. In this case, preferably both the quantity of reducing agent held in the lines and also the quantity of reducing agent present in the tank are taken into account. The heat capacity is a measure of the energy (to be discharged or absorbed) required to bring about a temperature difference in the delivery system components (without reducing agent). The heat capacity of the delivery system itself is temperature-dependent and can be ascertained experimentally and/or by simulation. Determination of an absolute thermal energy stored in the delivery system in method step a) serves primarily as a reference for the thermal energy to be determined in method step b) and does not have to be totally accurate.

In method step b), the required thermal energy (and/or, if appropriate, the location of the introduction of heat) is ascertained, in particular taking into account at least one of the following system parameters: the (current) ambient temperature, the specific heat capacity of the reducing agent, the heat of fusion of the reducing agent, the heat capacity of the delivery system, the thermal conductivity of the reducing agent and of the delivery system, and the quantity of reducing agent in the lines and the tank. In this case, the required thermal energy is chosen so that a predeterminable quantity of reducing agent is present in the liquid state in the delivery line and in the tank after the time interval.

In particular, the specific heat capacity of the reducing agent also takes into account the fact that the specific heat capacity of the reducing agent is different in the liquid and the frozen and solidified state. Thus, the specific heat capacity of liquid AdBlue® in the relevant temperature range of from −11° C. to 60° C. is from 3.4 J/gK [Joules per gram Kelvin] to 3.6 J/gK, and the specific heat capacity of frozen and solidified AdBlue® is from 1.4 J/gK to 1.7 J/gK in a temperature range of from −50° C. to −11° C. In order to increase the temperature of 100 g of liquid AdBlue® by 5° C., for example, 1.75 kJ [kilojoules] are therefore required. The heat of fusion of AdBlue® which is required to melt AdBlue® at −11° C. without an increase in temperature is 270 J/g [joules/gram]. In order, therefore, to melt 100 g of frozen and solidified AdBlue® and, at the same time, to raise the temperature thereof from −12° C. to −10° C., approximately 27.5 kJ are therefore required. The thermal conductivity of liquid AdBlue® at 25° C. is 0.5 W/mK [watts per meter Kelvin]. The heat capacity and thermal conductivity vary greatly between different delivery systems. However, the heat capacity and thermal conductivity of a particular delivery system in the relevant temperature range of from −50° C. to 60° C. can be determined experimentally and/or by computer simulation and can therefore likewise be assumed to be known.

The total heat capacity of the reducing agent in the tank and/or the total quantity of heat stored (or currently present) in the reducing agent in the tank can be taken into account as a system parameter in step b). The total heat capacity of the reducing agent in the tank is, in particular, the product of the specific heat capacity of the reducing agent and of the amount of reducing agent in the tank in kilograms. The amount of reducing agent can be determined by a filling level sensor. Especially in the case where there is frozen reducing agent in the tank, a filling level sensor cannot measure the filling level in the tank with sufficient accuracy, if at all. It is therefore possible to determine the filling level during an operating phase of the delivery system in which the reducing agent in the tank is completely liquid and to store this measured value in a memory of a control unit. This filling level can then be used to determine or calculate the total heat capacity for method step b). The total quantity of heat stored in the reducing agent can be determined from the total heat capacity of the reducing agent and at least one temperature of the reducing agent in the tank. It is possible that just one temperature of the reducing agent will be measured and that the temperature will correspond to a mean temperature of the reducing agent in the tank. Moreover, it is also possible for a plurality of temperatures of the reducing agent to be determined at different locations in the tank and/or in the line system. This can be accomplished by using a plurality of temperature sensors in the tank. In another method variant, a temperature distribution in the reducing agent tank can be determined.

According to a simple calculation method, the stored quantity of heat can be ascertained or calculated from the product of the mean temperature of the reducing agent and of the total heat capacity. However, this simple calculation method may be too inaccurate due, in particular, to the phase transition of the reducing agent from liquid to solid or from solid to liquid. For the phase transition, a relatively large quantity of thermal energy is required, without the occurrence of an increase in temperature. Moreover, as already explained above, the specific heat capacity of reducing agent is not constant at all temperatures. Therefore, in a more accurate calculation method for the stored quantity of heat, the quantity of thermal energy required to reach a particular temperature of the reducing agent in the tank can be obtained by addition/integration, starting from a specified reference temperature. If a plurality of temperatures in the tank or even a temperature distribution in the tank is known, the quantity of thermal energy stored in the tank can also be determined precisely, with local resolution, and added/integrated over the entire tank volume. Thus, even more accurate determination of the stored quantity of thermal energy in the reducing agent in the tank is possible.

In method step b), the system parameters and the temperatures ascertained are fed, in particular, to an energy model of the delivery system, wherein, on one hand, the thermal energy that can be introduced by the electrically operated components and, on the other hand, the thermal energy flowing in from the environment or the thermal energy flowing out into the environment, are taken into account by the energy model. The energy model is preferably a three dimensional model of the delivery system, which takes into account the system parameters with local resolution, thus making it possible to take into account the quantities of thermal energy that have been introduced and released with local resolution and thus enabling the temperature distribution that is obtained in the delivery system through heat conduction to be predicted and/or determined. The energy model is thus capable of determining the thermal energy required by the individual electrically operated components.

The electrically operated components are switched on within the time interval in step c) while taking into account the quantities of thermal energy made available by the various electrically operated components. In this case, the electrically operated components are not switched on simultaneously but with a time offset relative to one another. However, it is quite possible for the various components to be operated simultaneously after being switched on with a time offset. Activation of the electrically operated components with a time offset prevents overloading of the onboard electrical network in an effective manner, especially when starting the motor vehicle after a prolonged stoppage.

If the supply of thermal energy in step c) is interrupted, the thermal energy introduced into (or discharged from) the delivery system in previous operation is taken into account when restarting in method step b), with the effect of the ambient temperature on the thermal energy balance of the delivery system during the stoppage time being taken into account, in particular. In this case, in particular, the fact that the temperature measured at one point in the delivery system is not necessarily characteristic of the entire delivery system is taken into account. For this purpose, it is possible, in particular, to have recourse to a comparison of the temperature measured in the delivery system and the temperature predicted by the energy model (with local resolution or local determination). It is thus possible to continue feeding in the thermal energy ascertained during previous operation, the supply of which was interrupted, without modification or, after determination in method step b), to readapt the required thermal energy.

In this way, a kind of pretesting is possible, in particular, according to which the system tests whether a currently measured temperature is also characteristic of the delivery system before or during initiation of step a). If a corrective temperature measurement (with a time offset or spatial offset) shows that the delivery system is not "in equilibrium" but that a hot spot has formed locally (due, for example, to a previous, possibly interrupted, heating operation), the energy model can take this into account. It is likewise possible, in addition or as an alternative, for important parameters of the last heating operation to be stored, thus enabling the residual thermal energy to be calculated and subsequently taken into account. It is thus possible to check and correct even faulty temperature measurement results.

Switching on the electrically operated components with a time offset is preferably used first of all to thaw the reducing agent held in the lines of the metering module and the reducing agent adjoining the metering module in the tank. In particular, the electrically operated components are switched on in such a way that, first of all, heat is introduced into the reducing agent along the lines, through the inner surfaces thereof. The amount of thermal energy introduced and/or the location of heat introduction is/are, in particular, chosen in such a way that no ice cavity forms in the reducing agent, even if a relatively large quantity of reducing agent is removed in relation to the quantity of reducing agent that is normally used.

In accordance with another mode of the invention, the time offset for the activation of the electrically operated components is preferably at least 30 seconds in each case, particularly preferably at least 60 seconds, very particularly preferably at least 120 seconds. The term "time offset" is intended, in particular, to mean the period of time between the activation of a first electrically operated component and a second electrically operated component. As a very particularly preferred option, the majority or even all of the energy-consuming components of the delivery system are switched on or activated with such a time offset. In particular, the time offset is matched to the power consumption characteristic of the PTC heating elements being used.

In accordance with a further advantageous mode of the invention, (in method step b)) the required energy is determined in such a way that at least three times, preferably six times, the quantity of reducing agent to be delivered per hour should be supplied in liquid form after the time interval. It is possible in this case either for the delivery rate determined as an average over a previously specified observation time interval or the maximum delivery rate of the reducing agent to be taken as a basis for the determination of the required energy. In the case of an average delivery rate of a delivery system in a passenger car of 150 ml/h [milliliters per hour], at least 400 ml of reducing agent should thus have been thawed after 20 minutes. This is an effective way of preventing the formation of an ice cavity in the reducing agent tank, thereby preventing a deterioration in thermal conductivity and hence in the continued thawing of the reducing agent.

In accordance with an added advantageous mode of the invention, an ambient temperature is ascertained and taken into account, at least for step a) or step b). Thus, in step b), in particular, the thermal energy flowing off into the environment or flowing in from the environment can be taken into account, and therefore the thermal energy made available by the electrically operated components in step c) is adapted.

In accordance with an additional mode of the invention, the delivery system has at least two of the following electrically operated components, which are switched on in the following sequence in step c): electric heater, pump, filter heater, solenoid valve, sensor. By activating the electric heater(s) first, at least some of the reducing agent present in the metering module and of the reducing agent in the tank adjoining the metering module is at least partially thawed first of all. Preferably, at least some of the reducing agent is in a deliverable state after the time interval, and therefore the reducing agent in the metering module continues to be heated up when the pump, the filter heater, the solenoid valve and/or the sensor are switched on with a time offset. Thus, for example, a pump suitable for the present purpose makes available to the delivery system a heat output of 30 W [watts] to 50 W and a solenoid valve makes available a heat output of 5 W to 20 W. Effective heating without formation of an ice cavity and without overloading the onboard electrical network is thus ensured.

In accordance with yet another advantageous mode of the invention, the delivery system has a plurality of PTC heating elements, which are activated with a time offset in order to feed in the required thermal energy. The PTC heating elements require a maximum power within the first minute after being switched on, and this subsequently falls to a value of less than 70% of the maximum value. Since the required power, especially that of the PTC heating elements, is furthermore not constant over time, high demands are made on the onboard electrical network of a motor vehicle if all of the components required for heating are switched on at the same time. Precisely when using PTC heating elements, activation with a time offset prevents overloading of the onboard electrical network since, after activation, they have a rising power consumption, which declines again after a certain time to a lower, relatively constant value.

In accordance with yet a further mode of the invention, the time interval preferably has a value of 10 minutes to 20 minutes, preferably 15 minutes to 20 minutes.

In accordance with yet an added mode of the invention, at least one temperature of the delivery system is ascertained by at least one temperature sensor for step a), with the sensor being disposed at least at one of the following positions:
in an opening in a heat-conducting carrier plate of the delivery system,
on a circuit board for control electronics disposed within a housing of the delivery system,
at a pump of the delivery system,
at a distributor block of the delivery system.

At all of these positions, there is a temperature characteristic of the delivery system, making it possible to accurately determine the thermal energy stored in the delivery system in step a). As a particularly preferred option, an average value of temperatures measured at two positions is taken as a basis in this case for determining the thermal energy stored in the delivery system. It is furthermore preferred that the ambient temperature should be taken into account in determining the characteristic temperature.

In accordance with yet an additional mode of the invention, in order to allow reliable operation of the pump and to prevent a possible malfunction of the pump of the delivery system, the pump is initially operated with a reduced driving power in step c) in order to ascertain whether or not there is still frozen reducing agent in lines of the delivery system. If it is found that there is still frozen reducing agent in lines of the delivery system, the thermal energy to be introduced can be deliberately increased to ensure that this reducing agent thaws.

With the objects of the invention in view, there is concomitantly provided a motor vehicle, comprising an internal combustion engine, an exhaust gas treatment device for cleaning the exhaust gases of the internal combustion engine, a delivery system for delivering reducing agent to the exhaust gas treatment device and a control unit, which is connected to the delivery system and is configured to operate the delivery system in accordance with the method according to the invention. For this purpose, control software which monitors and commands the operation or activation of the components through suitably provided signal lines can be provided, for example.

Other features which are considered as characteristic for the invention are set forth in the appended claims, noting that the features and steps presented individually in the dependent claims can be combined in any technologically meaningful way and give rise to further embodiments of the invention.

Although the invention is illustrated and described herein as embodied in a method for heating a delivery system and a motor vehicle having a delivery system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
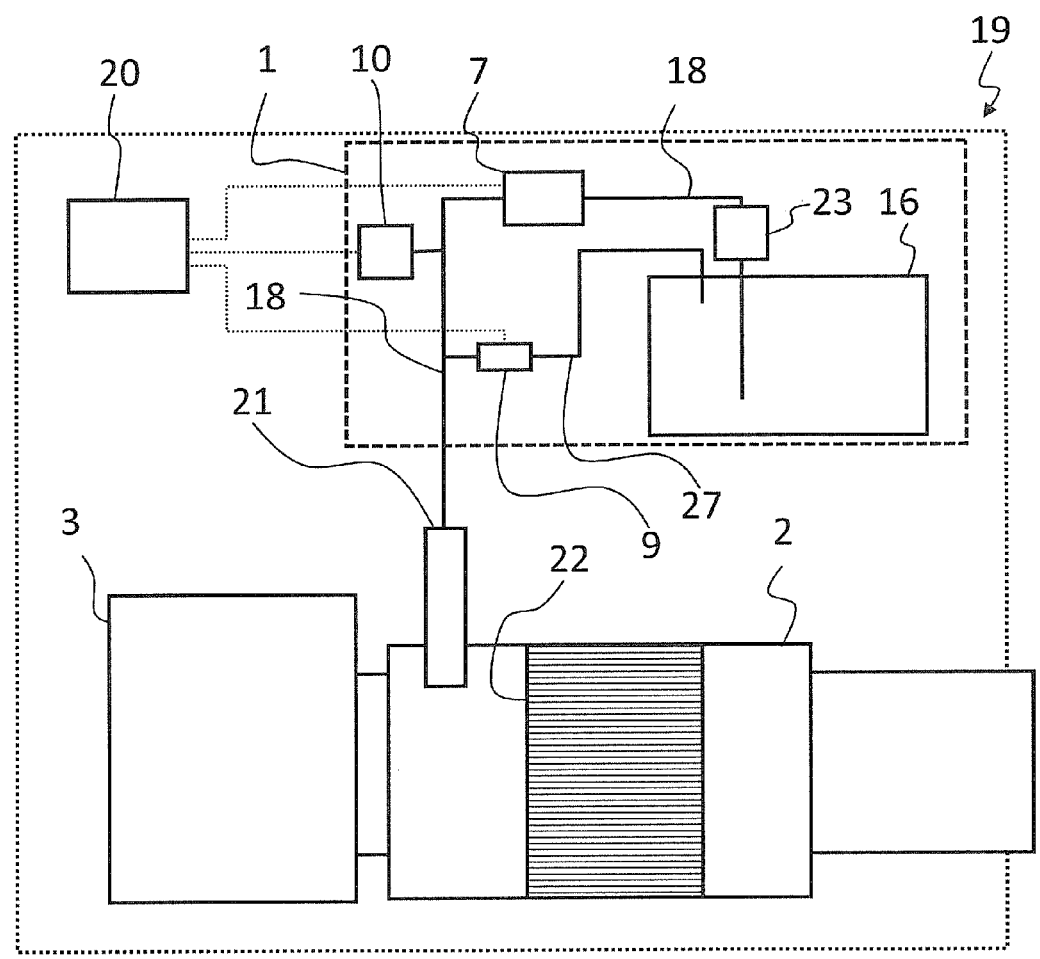
FIG. 1 is a block diagram of a motor vehicle having a delivery system for reducing agent.

Referring now in detail to the figures of the drawings, which show particularly preferred embodiments to which the invention is not limited, and first, particularly, to FIG. 1 thereof, there is seen a block diagram of a motor vehicle 19 having an internal combustion engine 3 and an exhaust gas treatment device 2 including a catalytic converter 22 for cleaning exhaust gases from the internal combustion engine 3. The motor vehicle 19 furthermore includes a delivery system 1 for feeding a reducing agent into the exhaust gas treatment device 2 by using an injector 21. The delivery system 1 has a tank 16 for storing reducing agent and a pump 7 for removing the reducing agent through a line 18. A filter 23 for cleaning the reducing agent is furthermore disposed in the line 18. A sensor 10, which is disposed downstream of the pump 7 in the line 18, is configured to detect operating parameters of the reducing agent in the line 18. For example, the pressure or the temperature of the reducing agent can be monitored in this case. A solenoid valve 9, which allows the reducing agent to be returned to the tank 16 through a return line 27, is provided for ventilation of the line 18. In order to monitor and control the delivery system 1, the motor vehicle 19 includes a control unit 20, which is connected to the pump 7, the sensor 10 and the solenoid valve 9. Fundamentally, it is also possible for these components to be disposed as a module in/on the tank 16.

Figure 2:
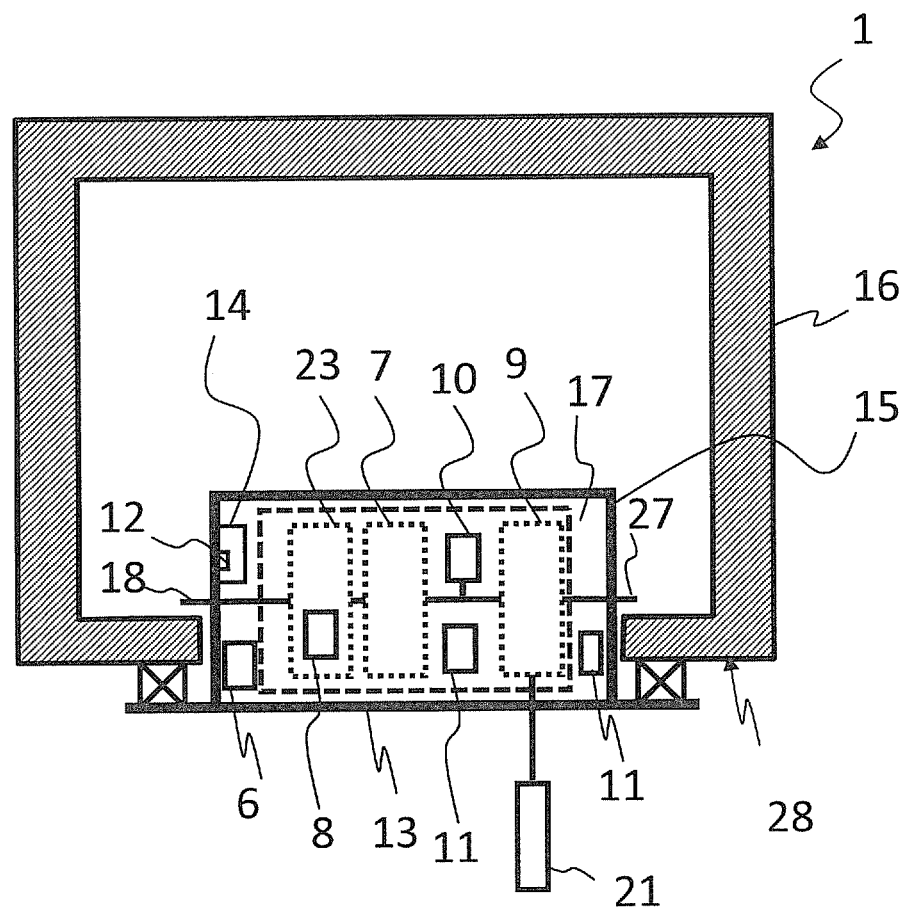
FIG. 2 is a cross-sectional view of a delivery system for reducing agent.

Another embodiment of a delivery system 1 is illustrated diagrammatically in FIG. 2. The delivery system 1 includes a tank 16 having a base 28 into which a housing 15 having further component parts of the delivery system 1 is recessed. The housing 15 is thus in direct contact with the reducing agent in the tank 16. A line 18, a filter 23 having a filter heater 8, a pump 7, a sensor 10, a plurality of PTC heating elements 11 and a solenoid valve 9, are integrated in a distributor block 17 in the housing 15. An electric heater 6 and a circuit board 14 having a temperature sensor 12 are furthermore disposed in the housing 15. Control electronics or a control unit are/is integrated on the circuit board 14 and connected by non-illustrated signal lines to the electrically operated components 6, 7, 8, 9, 10, 11. The housing 15 and the distributor block 17 are disposed on a thermally conductive carrier plate 13.

Reducing agent is removed from the tank 16 through the line 18 on the left-hand side with the aid of the pump 7, and is first of all cleaned in the filter 23. The sensor 10 monitors the parameters of the reducing agent present in the line 18 allowing reducing agent to be directed back into the tank 16 through the return line 27 by switching the solenoid valve 9, if appropriate. During regular operation, however, the reducing agent is passed to an injector 21.

At temperatures below −11° C., the reducing agent freezes and solidifies. The present invention therefore proposes a method for heating the delivery system 1, especially after a prolonged stoppage of the motor vehicle 19. Accordingly, thermal energy stored in the delivery system 1 should be determined in order to then determine thermal energy required for trouble-free operation. The thermal energy thus determined should be introduced into the delivery system 1 by using waste heat of the electrically operated components 6 to 11, in which case the electrically operated components 6 to 11 are each activated with a time offset 5.

Figure 3:
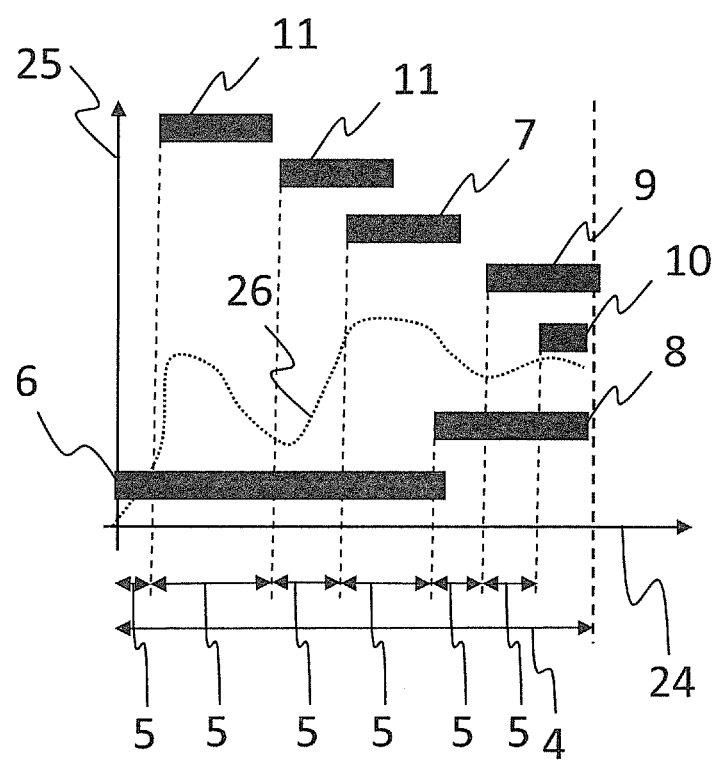
FIG. 3 is a diagram intended to illustrate the method according to the invention.

In order to illustrate the method according to the invention, FIG. 3 graphically shows a diagram indicating a current profile 26 of the delivery system 1 with respect to time, in which case time 24 is plotted on the abscissa and current 25 is plotted on the ordinate. The operating times of the electrically operated components 6 to 11 are shown graphically as black blocks. The current profile 26, plotted as current 25 against time 24, is indicated by a dotted line. All of the electrically operated components 6 to 11 should be activated within a time interval 4. The electrically operated components, electric heater 6, pump 7, filter heater 8, solenoid valve 9, sensor 10 and PTC heating elements 11, are each activated with the time offset 5 relative to one another. A resulting required current for the delivery system 1 is indicated by way of example by the dotted line of the current profile 26. The time offset is at least 30 seconds. Due to the time offset 5 of the activation of the electronic components 6 to 11, the required current in the time interval 4 is limited to a predeterminable magnitude. Overloading of the onboard electrical network is thus avoided.

Through the use of the method according to the invention, overloading of an onboard electrical network of a motor vehicle 19 during the heating of the delivery system 1 is prevented in an effective manner. Moreover, formation of an ice cavity in the reducing agent in the tank 16 is avoided.

The invention claimed is:

1. A method for heating a delivery system including a tank for supplying reducing agent to an exhaust gas treatment device of an internal combustion engine having a multiplicity of electrically operated components, the multiplicity of electrically operated components including at least an electrically operated pump, at least one electrically operated heater and at least one other electrically operated component, the multiplicity of electrically operated components is placed in a housing at a bottom of the tank, the method comprising the following steps:
    a) determining at least one temperature in the delivery system;
    b) determining a required amount or quantity of thermal energy required for operation of the delivery system in a time interval during starting of the delivery system;
    c) feeding the required amount or quantity of thermal energy into the delivery system by operating the electrically operated components within the time interval; and activating each of the electrically operated components with a respective time offset.

2. The method according to claim 1, which further comprises setting each respective time offset for activation of the electrically operated components at least at 30 seconds.

3. The method according to claim 1, which further comprises carrying out the step of determining the required amount or quantity of thermal energy to cause a quantity of reducing agent to be delivered per hour to be supplied in liquid form at least three times after the time interval.

4. The method according to claim 1, which further comprises ascertaining and taking an ambient temperature into account at least for step b).

5. The method according to claim 1, which further comprises:
    providing the delivery system with at least one of the following electrically operated components as the other electrically operated component: filter heater, solenoid valve, or sensor.

6. The method according to claim 1, which further comprises providing the delivery system with a plurality of PTC heating elements being activated with a time offset in order to feed in the required thermal energy.

7. The method according to claim 1, which further comprises setting a value of 10 minutes to 20 minutes for the time interval.

8. The method according to claim 1, which further comprises ascertaining at least one temperature of the delivery system using at least one temperature sensor for step a), and placing the at least one temperature sensor at least at one of the following positions:
    at the housing of the delivery system;
    on a circuit board for control electronics disposed within the housing of the delivery system;
    at a pump of the delivery system; or
    at a distributor block of the delivery system.

9. The method according to claim 1, which further comprises providing the delivery system with a pump and lines, and initially operating the pump of the delivery system with a reduced driving power in step c) in order to ascertain if frozen reducing agent is still in lines of the delivery system.

10. A motor vehicle, comprising:
    an internal combustion engine;
    an exhaust gas treatment device for cleaning exhaust gases of said internal combustion engine;
    a delivery system including a tank, said delivery system being configured to deliver reducing agent to said exhaust gas treatment device and having a multiplicity of electrically operated components, said multiplicity of electrically operated components including at least an electrically operated pump, at least one electrically operated heater and at least one other electrically operated component, said multiplicity of electrically operated components being placed in a housing at a bottom of the tank; and
    a controller connected to said delivery system and configured to operate said delivery system to:
        determine at least one temperature in said delivery system;
        determine a required amount or quantity of thermal energy required for operation of said delivery system in a time interval during starting of the delivery system;
        feed the required amount or quantity of thermal energy into said delivery system by operating said multiplicity of electrically operated components within the time interval; and
        activate each of said electrically operated components with a respective time offset.

11. The method according to claim 1, wherein a sequence of switching on the multiplicity of electrically operated components in step c) is predefined according to the following order:
    electric heater, pump, filter heater when present as a component of the delivery system, solenoid valve when present as a component of the delivery system, and sensor when present as a component of the delivery system.

12. The method according to claim 1, wherein the delivery system includes an ultrasonic sensor for detecting a filling level of reducing agent in the tank.

13. The method according to claim 1, wherein for determining the thermal energy in step b) at least the last known quantity of reducing agent stored in the tank and a current temperature of the delivery system are considered.

14. The method according to claim 1, wherein for determining the thermal energy in step b) different specific heat capacities of liquid reducing agent and of frozen and solidified reducing agent are considered.

15. The method according to claim 1, which further comprises simultaneously operating the electrically operated components after being switched on with the respective time offset.

16. The method according to claim 4, wherein thermal energy flowing off to or in from the environment is taken into account in step b) to adapt the thermal energy made available by the electrically operated components in step c).

17. The method according to claim 1, wherein the electrically operated components are connected to a distributor block.

* * * * *